April 11, 1939.   N. BORRESEN   2,154,228
VALVE
Filed April 27, 1937
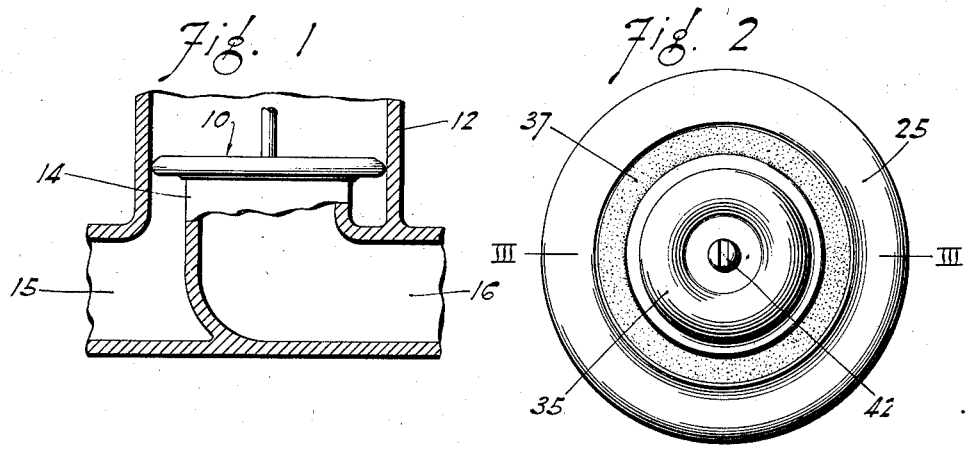
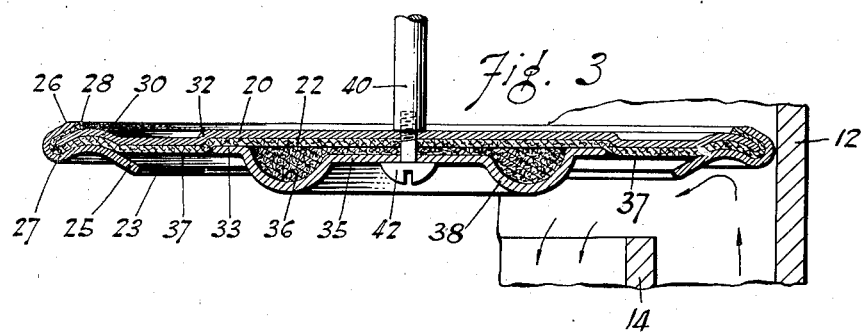
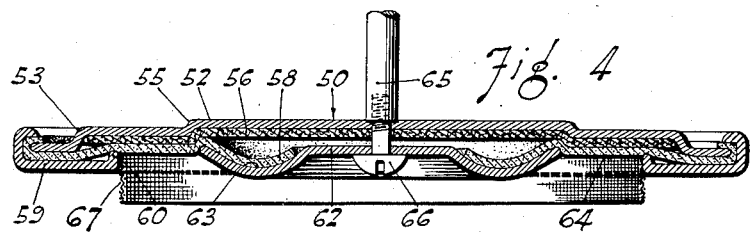
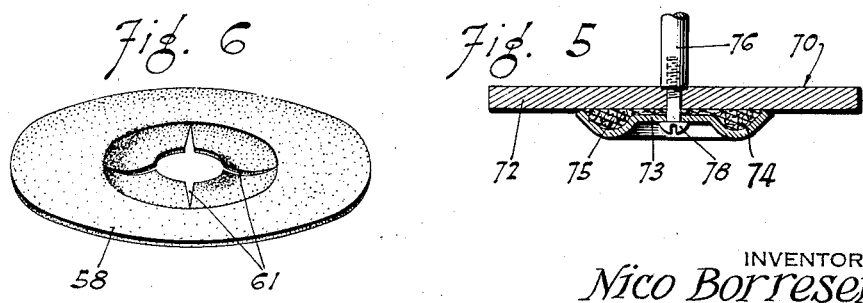
INVENTOR
*Nico Borresen,*
BY
*Beau, Brooks, Buckley & Beau.*
ATTORNEYS Patented Apr. 11, 1939

2,154,228

UNITED STATES PATENT OFFICE 2,154,228

VALVE

Nico Borresen, Buffalo, N. Y., assignor to Nicostat Products Co., Buffalo, N. Y.

Application April 27, 1937, Serial No. 139,229

11 Claims. (Cl. 251—159)

This invention relates to valves and more particularly to precision valves for controlling fluids of the gaseous and low viscosity types.

The application of a fluid sealing medium, such as oil, grease, water, or other suitable substance, to valve and valve seat contacting surfaces provides a filling for the minor inequalities of such surfaces, thus enabling the parts to provide an adequate seal against the thinner types of gases and fluids.

One object of the invention is to provide a valve structure comprising a reservoir for a fluid sealing medium arranged thereon in such manner that the sealing medium may be automatically released from the reservoir and transported to the valve seat contacting portion of the valve when and as it is needed to keep the latter covered by a film of the sealing medium.

Another object of the invention is to provide a valve structure for controlling the flow of gaseous fluids having means for preventing the excessive dissipation of fluid sealing medium from the valve seat contacting portions thereof.

The invention is exemplified in a construction comprising a valve member provided with valve seat contacting portions, a reservoir member for storage of a fluid sealing medium, elements for the conveyance of the sealing medium to the seat contacting portions, and a sealing substance disposed in the reservoir, either in liquid or solid initial state, which is capable of being moved by means of the conveying elements to the valve seat contacting portions as required to keep the latter saturated with sealing medium. Baffle members are provided upon the valve structure to deflect the stream of gas or fluid being controlled by the valve away from the valve seat contacting surfaces.

In the drawing:

Fig. 1 is a fragmentary vertical section of a valve chamber having a valve constructed according to the invention mounted therein;

Fig. 2 is a bottom plan view of the valve;

Fig. 3 is a fragmentary cross section taken substantially along the line III—III of Fig. 2 and showing a portion of the valve chamber;

Fig. 4 is a cross section somewhat similar to Fig. 3 and illustrating another arrangement of elements of the valve structure;

Fig. 5 is a cross section similar to Fig. 3 illustrating another form of the invention; and Fig. 6 is a perspective of a flexible sealing member of the valve structure.

In practicing the invention a valve 10 is disposed in a valve casing 12 and is adapted for seating upon the annular horizontal valve seat 14 which communicates in opposite directions with inlet and outlet conduit portions 15 and 16.

In the form of the invention shown in Figs. 2 and 3 the valve 10 comprises an upper plate 20 against which is arranged a flexible sealing member 22 composed of leather, fabric, or other suitable yieldable material. A circumferential retaining ring 23 is provided which has an inner marginal flange 25 and an inwardly turned upward flange 26 which are formed in such manner as to provide a well 27 in which the outer marginal portion of the flexible member 22 is disposed in overlapped relation about a curved marginal portion 30 of the plate 20.

A reservoir member 35, having a marginal portion 33 forces the flexible material 22 into the depression formed by an annular shoulder 32 formed in an intermediate portion of the plate 20, and the reservoir 35 is held in assembled relation with the plate 20 by means of a screw 42 which extends through the valve structure and is threaded into a valve stem 40 to which may be connected means (not shown) for opening and closing the valve.

The portion of the flexible member 22 intermediate of the retaining ring 23 and the reservoir 35 provides a valve seat contacting portion 37 which has been tightly stretched for co-operation with the valve seat 14 to control the flow of fluids through the device. The reservoir 35 is provided with an annular channel 36 which serves as a container for a suitable sealing medium or substance which impregnates the flexible material 22 and moves by capillary attraction and absorption to the valve seat contacting portion 37.

Since the portion 37 is formed of flexible material, it provides a yieldable valve seat contacting surface which remains at all times saturated with fluid sealing medium, and is thus adapted to provide an effective seal against the passage of even the thinnest types of gases or other fluids when the valve is closed.

The flange 25 at the lower side of the retaining ring is curved and thus serves as a channel for directing the fluid substances flowing thereagainst inwardly and away from the portion 37, (as shown in Fig. 3), to prevent the fluid flowing through the device from wiping the sealing medium away from the portion 37. A wick 38 may be arranged in the reservoir 35 to feed the sealing medium contained therein to the flexible member 22.

In the form of the invention shown in Fig. 4 a valve 50 comprises an upper plate 52 which is formed with annular shoulder portions 53 and 55, and a sheet of felt or similar material 56 which serves to space a flexible member 58 made of leather, or the like, from the plate 52. The member 56 also serves to pad the flexible member 58. The outer marginal portion of the member 58 is folded about the circumferential portion of the plate 52 and is clamped thereon by means of an annular retaining ring 59, the lower side of which is offset from the plane of the member 58. An inner upwardly extending flange 60 of the retaining ring 59 clamps the outer portions of the members 56 and 58 against the plate 52. A central reservoir 62 is provided with a channel portion 63 in which an inner portion of the flexible member 58 lies, and the outer circumferential portion of the reservoir forces the members 56 and 58 into the depression formed by the shoulders 55 and clamps the members 56 and 58 therein against the shoulder 55. There is thus provided a tightly drawn intermediate seat contacting portion 64 of the member 58.

A stem 65 disposed centrally on the valve 50 is rigidly secured thereto by means of a screw 66 which extends through the valve structure and is threaded into the end of the stem and serves to clamp the members of the valve structure together. As best shown in Fig. 6 the flexible member 58 is provided with radial slits 61 which permit the inner circumferential portion of the member to rest in the channel 63 of the reservoir.

In this form of the valve structure the inner marginal portions of the flexible member 58 function as wicks to convey the fluid sealing medium from the reservoir to the valve seat contacting portions 64. The member 56 functions as a wick or fluid storage device and also as a cushion behind the member 58 to increase the yieldability of the portion 37 for valve seat contacting purposes.

Since the lower side of the retaining ring 59 is offset from the plane of the seat contacting portion 64, it provides a baffle for deflecting the fluid flowing through the device away from the portion 64 in a manner similar to that illustrated in Fig. 3. A cylindrical guard 67 composed of fine mesh wire screening or other suitable material is also provided to prevent the deposit of dirt or other solid particles upon the surface of the valve seat contacting portion 64 of the valve. This guard interrupts the passage of any solid material particles moving with the gas stream toward the seat contacting surface, thus obviating the possibility of their sticking to the valve seat contacting surface and interfering with a perfect contact between the valve and the valve seat whenever the valve is moved to a closed position.

In Fig. 5 a valve structure 70 is shown in which a plate 72 formed of metal, fiber, glass, or some other suitable material is provided with a reservoir member 73 having a channel 74 adjacent its outer marginal portion and a wick or packing member 75 arranged within the channel for sealing fluid storage purposes. A valve stem 76 is disposed centrally of the valve structure and is rigidly connected thereto by suitable means such as a screw 78 which extends through the central portions of the reservoir and plate 72, and is threaded into the end of the stem. The reservoir and plate are thus rigidly secured together. Thus, a fluid sealing substance of suitable character, having been placed within the reservoir 73, will constantly spread outwardly of the reservoir between the contacting portions of the reservoir 73 and the plate 72 over the surface of the plate 72 to the valve seat contacting portions thereof to maintain a film of sealing medium upon these seat contacting surfaces.

It will be understood further that the apparatus and system described and shown herein is merely illustrative of the inventive principles involved, which may be applied to other physical embodiments without departing from the scope and spirit of the invention claimed.

I claim:

1. In a valve structure for accurately controlling flow of materials, a valve seat contacting portion, a reservoir for a fluid sealing medium, and means for transmitting said sealing medium to said valve seat contacting portion as may be required to provide a positive sealing effect when said valve is seated.

2. In a valve structure for accurately controlling flow of materials, a valve seat contacting portion, a reservoir for a fluid sealing medium, a wick in said reservoir, and means for transmitting said sealing medium to said valve seat contacting portion as required to provide a positive seal when said valve is seated.

3. In a valve structure for controlling flow of materials, a valve seat contacting portion, a reservoir for a fluid sealing medium, means for transmitting said sealing medium to said valve seat contacting portion to provide positive sealing effects when said valve is seated, and baffle means for deflecting the controlled flow away from said seat contacting portion.

4. A valve structure comprising a base member, a valve seat contacting member supported upon said base member, a cup shaped fluid reservoir member mounted upon said base member adjacent said contacting member, and a retaining ring disposed about the marginal portion of said base member and clamping the outer marginal portion of said seat contacting member against said base member.

5. A valve structure comprising a supporting member, a yieldable valve seat contacting member, a cup member mounted upon said supporting member for retaining fluid sealing substances, a clamping ring disposed about the marginal portion of said supporting structure and holding the outer marginal portions of the seat contacting member upon said supporting structure.

6. A disc valve structure for controlling flow of materials comprising a disc shaped base member, a valve seat contacting member supported upon said base member, a cup member centrally mounted upon said base member and clamping an intermediate portion of said valve seat contacting member to said base member, a retaining ring disposed about the marginal portion of said base member and spaced from said cup member and clamping the outer marginal portion of said seat contacting member upon said base member, said retaining ring being formed with a baffle surface for deflecting the controlled flow away from said seat contacting member.

7. A valve structure comprising a base member, a foraminous valve seat contacting member supported upon said base member, and a reservoir for a liquid valve sealing substance mounted upon said structure, said seat contacting member having a portion disposed within said reservoir in contact with said sealing substance.

8. A valve structure comprising a base member, a yieldable and foraminous valve seat contacting member supported upon said base member, a reservoir for supporting a fluid sealing substance in contact with a portion of said valve seat contacting member, and a sealing fluid absorbing padding member disposed between said base member and said seat contacting member.

9. In a valve structure for controlling flow of materials, a valve seat contacting portion, a reservoir for a fluid valve sealing medium, means for transmitting said sealing medium to said valve seat contacting portion to provide a positive sealing effect when said valve is seated, and a perforated guard member disposed adjacent said valve seat contacting portion and extending laterally thereto for intercepting movement of solid particles of the controlled flow toward said valve seat contacting portion.

10. A disc valve structure for controlling flow of materials comprising a generally disc shaped base member formed with an offset central portion, a valve seat contacting member of resilient material arranged adjacent said base member, a retaining ring disposed about the marginal portion of said base member and clamping the outer marginal portion of said seat contacting member upon said base member, and a cup shaped member centrally mounted upon said base member and having its marginal edge adjacent the marginal edge of said offset portion and means for urging said cup shaped member toward said base member against the resilient force of said seat contacting member in such manner as to tighten and maintain said seat contacting member in a taut condition against said base member.

11. A valve structure comprising a base member, a valve seat contacting member supported upon said base member and composed of fibrous material adapted to transmit liquid therethrough by capillary action, and a reservoir for fiber treating liquid mounted upon said structure and adapted to support a supply of fiber treating liquid in contact with a portion of said valve seat contacting member.

NICO BORRESEN.